US011955145B1

(12) United States Patent
Kaufman et al.

(10) Patent No.: US 11,955,145 B1
(45) Date of Patent: Apr. 9, 2024

(54) SYSTEM FOR SYNCHRONIZING VIDEO OUTPUT BASED ON USER ACTIVITY

(71) Applicant: AMAZON TECHNOLOGIES, INC., Seattle, WA (US)

(72) Inventors: Dotan Kaufman, Netanya (IL); Guy Adam, Tel Aviv (IL); Eran Borenstein, Zichron Yaakov (IL); Ianir Ideses, Raanana (IL); Eduard Oks, Redmond, WA (US); Noam Sorek, Zichron Yaakov (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/113,888

(22) Filed: Dec. 7, 2020

(51) Int. Cl.
*G11B 27/19* (2006.01)
*G06T 7/70* (2017.01)
*G06V 40/20* (2022.01)
*G11B 27/11* (2006.01)
*G11B 27/00* (2006.01)

(52) U.S. Cl.
CPC ............... *G11B 27/19* (2013.01); *G06T 7/70* (2017.01); *G06V 40/23* (2022.01); *G11B 27/11* (2013.01); *G06T 2207/10016* (2013.01); *G06T 2207/30196* (2013.01)

(58) Field of Classification Search
USPC ............... 386/278, 280, 282, 285, 239, 248
See application file for complete search history.

(56) References Cited

U.S. PATENT DOCUMENTS

| 6,514,081 | B1 * | 2/2003 | Mengoli | A63B 24/0003 |
| | | | | 434/252 |
| 2018/0357472 | A1 * | 12/2018 | Dreessen | G06V 40/23 |

* cited by examiner

*Primary Examiner* — Daquan Zhao
(74) *Attorney, Agent, or Firm* — Lindauer Law, PLLC

(57) ABSTRACT

Video output is synchronized to the actions of a user by determining positions of the user's body based on acquired video of the user. The positions of the user's body are compared to the positions of a body shown in the video output to determine corresponding positions in the video output. The video output may then be synchronized so that the subsequent output that is shown corresponds to the subsequent position attempted by the user. The rate of movement of the user may be used to determine output characteristics for the video to cause the body shown in the video output to appear to move at a similar rate to that of the user. If the user moves at a rate less than a threshold or performs an activity erroneously, the video output may be slowed or portions of the video output may be repeated.

21 Claims, 8 Drawing Sheets

SYSTEM FOR SYNCHRONIZING VIDEO OUTPUT BASED ON USER ACTIVITY

BACKGROUND

Instructional content for performing fitness exercises or other types of activities may be provided as video output. However, if a user has difficulty learning a new activity, performing an activity correctly, or performing an activity at a desired rate, the speed at which the content is presented in the video output may cause the video output to become desynchronized with the user. In some cases, after the video output becomes desynchronized, a user may manually replay portions of the video output, which may create a negative user experience.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
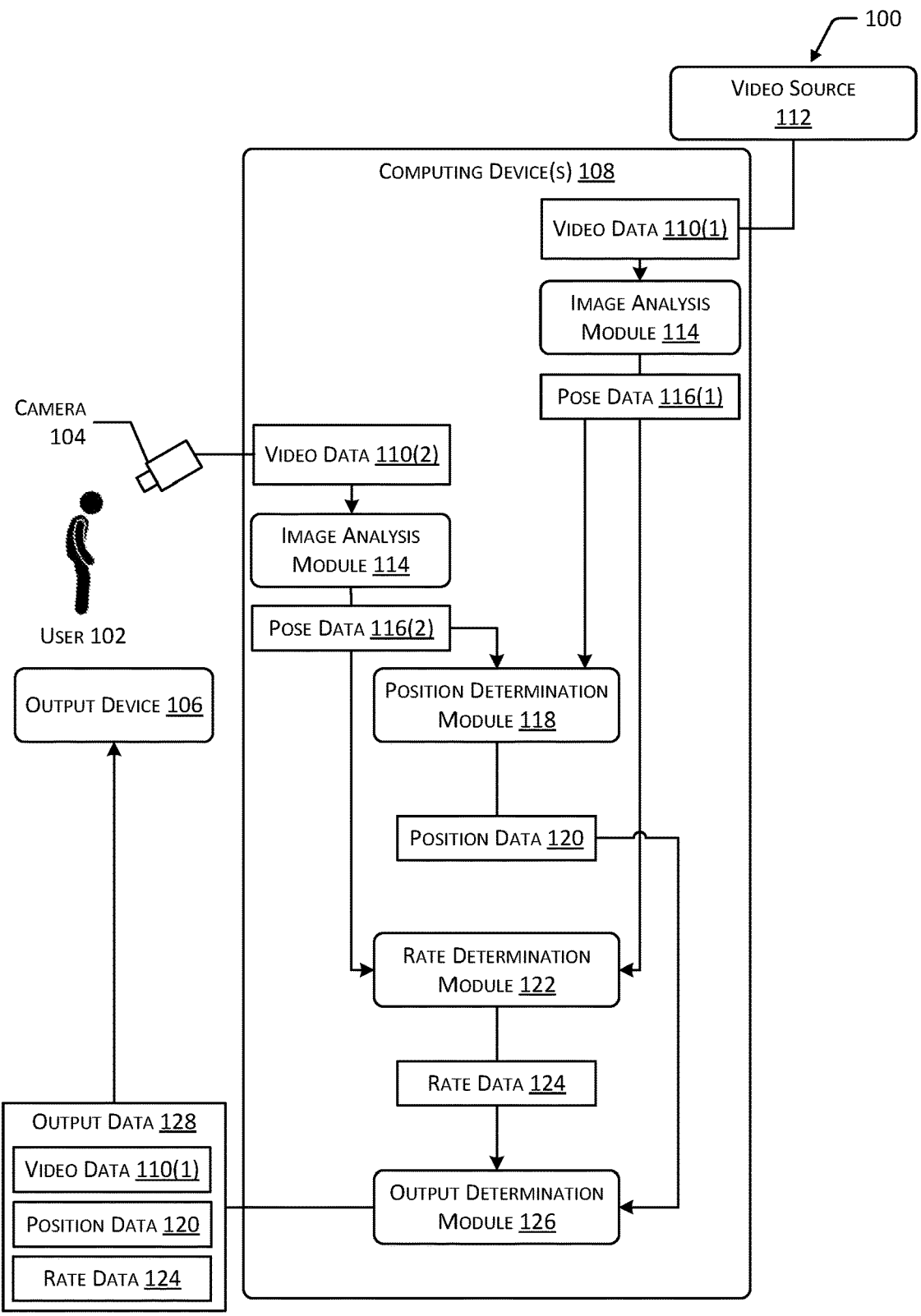
FIG. 1 is a block diagram depicting an implementation of a system for synchronizing the output of a video based on the movement and position of a user determined based on data acquired using a camera.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Instruction for performing fitness exercises and other types of activities may be available to users in the form of recorded videos. For example, a user may access a data storage medium that stores multiple videos to locate a particular video associated with an activity that is of interest to the user, such as by manually searching a list or inputting a search query. Continuing the example, a user may access an instructional video for performance of a fitness exercise that presents an instructor performing the fitness exercise while providing verbal instruction, while the user attempts to perform the exercise in the same manner and at the same rate as the instructor. In some cases, a user may fail to perform an activity correctly, or may fail to perform the activity at the same rate as the instructor. In such a case, the instructor and the user may become desynchronized, and the instructor may be shown performing portions of the activity that do not correspond to the portions of the activity being performed by the user. For example, at a particular time, the body of the instructor and the body of the user may be in different positions that correspond to different portions of a fitness exercise. When a user is attempting to learn a new activity, is experiencing difficulty performing an activity correctly, or is experiencing difficulty performing an activity at the same rate as an instructor shown in a video, this desynchronization may hinder the ability of the user to learn and understand the activity or to perform the activity effectively, creating a negative user experience.

Described in this disclosure are techniques for synchronizing the output of a video based on the activity of a user, and in some cases automatically replaying portions of the video. First video data that represents an instructor or other user performing an activity may be analyzed to determine pose data indicative of the position of the instructor at one or more times (e.g., in one or more frames) within the video data. For example, the first video data may include a recorded video in which an instructor demonstrates performance of a fitness exercise or other type of activity. In each frame of the recorded video, the pose of a body of the instructor may be determined. Each pose may be represented by a set of points, each point representing the location and orientation of a body part of the user, such as positions of the user's knees, feet, hips, head, and so forth. The locations and orientations of one or more points of a pose may be constrained by the location of one or more other points based on a set of rules. For example, the location of a point representing a user's foot may be constrained based on the location of a point representing the user's knee, and vice versa. As another example, the location of points representing a user's wrist, shoulder, and elbow may be constrained by a rule indicating a maximum or minimum angle at which the elbow may be positioned. The determined pose data may also include segmentation data, shape data, and so forth, which may be determined based on the first video data. For example, data indicating portions of a video that depict a user, a background, other objects, and so forth may also be determined. Therefore, based on the first pose data a position of an instructor's body may be determined for each frame of the first video data.

A camera may be used to acquire second video data that represents a participant or other user performing the activity. For example, while viewing instructional output associated with the first video data, a participant may attempt to perform the activity within the field of view of a camera. The second video data may be analyzed to determine second pose data that indicates the position of the participant at one or more times (e.g., in one or more frames) within the second video data. Each pose of the second pose data may also be represented by a set of points, each point representing a location and orientation of a body part of a user. Based on the second pose data, a position of a participant's body may be determined for each frame of the second video data.

The second pose data determined from the second video data is then compared to the first pose data determined from the first video data to determine one or more positions of the participant's body that correspond to one or more positions of the instructor's body. This comparison may be used to determine a portion of the first video data that corresponds to the portion of the activity that is currently being performed by the participant. The comparison may include determining multiple corresponding poses in the first pose data and the second pose data. For example, a participant viewing the first video data may attempt to perform a squatting exercise, in which the participant begins in an upright position, bends the knees to lower the body into a squatting position, then returns to the upright position. The first video data may include multiple frames in which the body of the instructor is shown in an upright position, such as at the beginning and at the completion of a repetition of an exercise. However, by determining multiple corresponding poses, the specific portion of an activity being performed by a participant, such as whether the participant's body is currently descending toward a squatting position or rising toward an upright position, may be determined.

After determining the portion of an activity that is currently being performed by a participant, the portion of the first video data that corresponds to the portion of the activity that is being performed may be presented. For example, if the movement of a participant has become desynchronized from the movement of an instructor that is presented in a video, the portion of the video that corresponds to the current position of the user may be presented based on this determination. Additionally, in some implementations, an output rate for the first video data may be determined that may cause the instructor presented in the first video to appear to move at a rate that corresponds to the rate at which the participant is performing the activity. For example, the times at which the body of a participant reaches specific positions during performance of an activity, such as the duration of an interval of time between the times at which a participant reaches two positions, may be used to determine a rate at which the activity is performed by the participant. Similarly, the times at which the body of the instructor reaches different positions may be used to determine a rate at which the activity is presented by the instructor. A relationship between these two rates, or between the intervals of time during which two sets of corresponding positions are reached by the participant and the instructor, may be used to determine an output rate for the first video data that may cause the body of the instructor to appear to move at a rate similar to the rate at which the participant is performing the activity. As a result, the participant may experience less difficulty remaining synchronized with the movement of the instructor. During performance of the activity, as the rate of movement of the participant changes, the output rate for the first video data may be modified to continue to cause the movement of the instructor to appear to be performed at a rate similar to the rate of movement of the participant.

Additionally, in some implementations, if a position of the body of the participant is determined to differ from the position of the body of the instructor by at least a threshold, such as when a participant performs a portion of an activity incorrectly, a portion of the video that corresponds to correct performance of the corresponding portion of the activity may be presented. For example, if a participant does not correctly perform a particular position or the participant's body is in a position indicative of an error in performance of the activity, a portion of the first video data may be repeated, or a portion of the first video data that corresponds to correct performance of the position may be determined and presented. As a result, the participant may experience less difficulty learning correct performance of an activity due to presentation of relevant portions of the first video data automatically, without requiring manual replaying of portions of the video data by the participant.

In some implementations, a portion of a video that corresponds to a subsequent activity or a subsequent portion of the activity may be presented based on correct performance of the activity by a participant. For example, if the positions of the body of the participant correspond to the positions of the instructor presented in a video within a threshold tolerance, this may indicate correct performance of the activity by the participant, and a portion of a video corresponding to a subsequent activity or portion of the activity may be presented. As another example, if a rate of performance of the participant exceeds a threshold rate that indicates correct performance of an activity, familiarity with the activity, and so forth, a portion of a video corresponding to a subsequent activity or portion of the activity may be presented. In some implementations, sensor data from one or more sensors associated with a participant may be acquired. For example, a physiological value, such as a heart rate, respiratory rate, blood pressure, and so forth, may be determined based on sensor data. As another example, a sensor may include an audio sensor that may receive voice commands from a user, or may determine a level of exertion associated with performance of the activity based on audible breath, tone of voice, and so forth. If a determined physiological value is within a threshold range, this may indicate correct performance of an activity, familiarity with the activity, and so forth, and a portion of a video corresponding to a subsequent activity or portion of the activity may be presented. Continuing the example, in some cases, a rate of movement of a participant may be determined based in part on data indicative of one or more physiological values, such as a heart rate. In other cases, a determined physiological value may indicate incorrect performance or a lack of familiarity with an activity, and a portion of a video that corresponds to correct performance of a portion of the activity currently performed by the participant may be replayed.

FIG. 1 is a block diagram 100 depicting an implementation of a system for synchronizing the output of a video based on the movement and position of a user 102, determined based on data acquired using a camera 104. For example, a user 102 that intends to perform an activity may select an instructional video or other type of video in which an instructor or other individual is shown performing the activity, which may be presented using an output device 106. The user 102 may then attempt to perform the activity, during presentation of the video, within the field of view of the camera 104.

Continuing the example, the user 102 may provide user input indicative of or selecting a video to one or more computing devices 108. For example, a user 102 may select a particular video from a list, menu, or other type of interface. As another example, a user 102 may provide a search query or other indication of particular characteristics of a video, and the computing device(s) 108 may determine correspondence between the characteristics input by the user 102 and the characteristics of one or more videos. In other implementations, the computing device(s) 108 may determine correspondence between user data indicative of previous performance of one or more activities by the user 102 and characteristics of one or more videos and may generate a recommendation indicative of one or more videos for presentation. In still other implementations, video data 110 may be selected for presentation based on movement of the user 102. For example, the user 102 may begin performing an activity within a field of view of the camera 104, and the positions of the body of the user 102 may be matched with the positions of a body of an instructor or other individual in stored video data 110. Independent of the manner in which a video for presentation is determined, the computing device(s) 108 may access first video data 110(1) that includes the determined video. The first video data 110(1) may be accessed from one or more video sources 112.

In some implementations, the computing device(s) 108 may be separate from one or more of the camera 104, output device 106, or video source(s) 112, as shown in FIG. 1. For example, the computing device(s) 108 may include one or more servers that receive input from a separate device accessed by the user 102. In other implementations, the computing device(s) 108 may be associated with one or more of the camera 104, output device 106, or video source 112. For example, the computing device(s) 108 may include a smartphone having an integrated camera 104 and one or more output devices 106, such as touchscreen displays and speakers, that may present video and audio output. In some cases, the computing device(s) 108 may store the first video data 110(1). For example, the video source 112 may include data storage accessible to the computing device(s) 108. In other cases, the video source 112 may include one or more remote data sources which may provide the first video data 110(1) to the computing device(s) 108 in response to a request from the computing device(s) 108, user input by the user 102, and so forth. In other implementations, combinations of servers, personal computing devices, remote data sources, and so forth may be used. Any number and any type of computing device(s) 108 may be used including, without limitation, personal computing devices, portable computing devices, wearable computing devices, servers, set top boxes, and so forth. For example, a personal computing device in an environment with the user 102 may receive data from the camera 104 and perform a portion of the functions described herein, while one or more servers may receive data from the personal computing device or from the camera 104 and perform other functions.

An image analysis module 114 associated with the computing device(s) 108 may determine first pose data 116(1) based on the first video data 110(1). In some implementations, the image analysis module 114 may include one or more object recognition or segmentation algorithms that may identify portions of frames of video data 110(1) in which an individual, such as an instructor, is visible. For example, an object recognition algorithm may determine portions of a frame of video data 110 that correspond to particular body parts of the instructor. As described previously, the determined positions of parts of an individual's body may be represented as a set of points. The locations and orientations of one or more points may be constrained by the location of one or more other points based on a set of rules. In some implementations, each point of a pose may associate an identifier of the point with a particular location or orientation of the point. In some implementations, data regarding a point may also indicate movement of the point, a confidence value associated with the location of the point, and so forth. In some implementations, the pose data 116(1) may also include segmentation information, shape information, information regarding a three-dimensional position of an individual or other object (such as information determined using a depth (e.g., RGB-D) camera), and so forth that may indicate portions of video data 110(1) that include an individual, a background, one or more other objects, and so forth. The pose data 116(1) may also include time data indicative of a frame or relative time associated with one or more poses represented by the pose data 116(1). For example, the pose data 116(1) may associate a first frame identifier or first time data indicative of a first time with a first set of points indicative of a first position of an instructor, and a second frame identifier or second time data with a second set of points indicative of a subsequent position of the instructor. For example, a rate of performance of an activity represented by the first video data 110(1) may be determined based on an interval of time between subsequent positions of the instructor.

In some implementations, the first pose data 116(1) determined based on the first video data 110(1) may be determined asynchronously, independent of the actions of the user 102 or the data received from the camera 104. For example, after receipt or generation of the first video data 110(1), the first pose data 116(1) may be determined and stored in association with the first video data 110(1) for future use, prior to acquisition of the second video data 110(2) using the camera 104. In some implementations, data indicative of a rate of performance of the activity may be determined based on the pose data and may also be stored in association with the first video data 110(1). For example, data indicative of a rate of performance of the activity may be used to indicate a difficulty of the activity or one or more characteristics of the activity. Continuing the example, in response to a search query indicative of a "high-impact" activity or a "cardiovascular" activity, first video data 110(1) representing an activity having a fast rate of performance may be determined. As another example, based on user data indicative of previous activities selected by a user 102, past performance of activities by the user 102, rates of performance of activities by the user 102, physiological values associated with the user 102, and so forth, first video data 110(1) representing an activity that corresponds to the capabilities, preferences, or historical performance by the user 102 may be determined.

As the user 102 performs the activity represented by the first video data 110(1) within the field of view of the camera 104, second video data 110(2) representing the performance of the activity by the user 102 may be acquired. The image analysis module 114 may determine second pose data 116(2) based on the second video data 110(2). Similar to the first pose data 116(1), the second pose data 116(2) may include a set of points that represents the determined positions of body parts of the user 102. The second pose data 116(2) may also include time data indicative of a frame or relative time associated with one or more poses represented by the second pose data 116(2). For example, a rate of performance of an activity by the user 102 may be determined based on an interval of time between subsequent positions indicated in the pose data 116(2).

A position determination module 118 associated with the computing device(s) 108 may determine position data 120 indicative of a portion of the first video data 110(1) that corresponds to the position of the body of the user 102. The position determination module 118 may determine correspondence between the first pose data 116(1), indicative of the positions of the body of an instructor or other individual in the first video data 110(1), and the second pose data 116(2), indicative of the positions of the body of the user 102. For example, the first video data 110(1) may depict an instructor in a first position, a second position subsequent to the first position, and a third position subsequent to the second position. Based on the second pose data 116(2), the position determination module 118 may determine that the body of the user 102 is in a position that is within a threshold similarity of the second position. The position data 120 may therefore indicate a portion of the first video data 110(1) in which the instructor's body is shown in the second position. In some cases, the position determination module 118 may determine multiple poses of the second pose data 116(2) that correspond to one or more poses of the first pose data 116(1). For example, during performance of an activity, an instructor represented in the first video data 110(1) may achieve identical or similar positions at multiple times. In such a case, a single position of the body of the user 102 may correspond to multiple possible positions represented in the first pose data 116(1). Therefore, correspondence between multiple positions of the second pose data 116(2) and multiple corresponding positions of the first pose data 116(1) may be used to determine a specific portion of the first video data 110(1) that represents the portion of an activity that is currently being performed by the user 102.

In some implementations, a rate determination module 122 associated with the computing device(s) 108 may determine rate data 124 indicative of an output rate for presentation of output based on the first video data 110(1). As described previously, based on the pose data 116(1), a first rate of performance of the activity represented in the first video data 110(1) may be determined. For example, the first pose data 116(1) may represent two or more positions of an instructor or other individual, each position associated with a particular time or frame identifier. Based on an interval of time between portions of the first video data 110(1) associated with subsequent positions, a rate of performance of an activity represented by the first video data 110(1) may be determined. In a similar manner, based on the second pose data 116(2), a second rate of performance for the activity by the user 102 may be determined. For example, based on an interval of time between one or more positions of the user 102 determined based on the second pose data 116(2), a rate of performance of the activity by the user 102 may be determined. The rate determination module 122 may determine a relationship between the rate of performance represented by the first video data 110(1) and the rate of performance of the activity by the user 102. Based on this relationship, an output rate for the first video data 110(1) may be determined that may cause the instructor or other individual represented in the first video data 110(1) to appear to perform the activity at a rate within a threshold tolerance of the rate at which the activity is performed by the user 102. For example, if the user 102 is performing the activity at a slower rate than that of an instructor presented in the first video data 110(1), the first video data 110(1) may be presented to cause the instructor to appear to move at a slower rate. If the user 102 performs the activity at a faster rate than that of the instructor, the first video data 110(1) may be presented to cause the instructor to appear to move at a faster rate. In some implementations, the output rate represented by the rate data 124 may be limited by one or more threshold values, such as a threshold maximum or minimum rate of performance of the activity.

An output determination module 126 associated with the computing device(s) 108 may determine output data 128 based on the first video data 110(1), the position data 120, and the rate data 124. The output data 128 may cause the output device 106 to present output based on the first video data 110(1). For example, based on the position data 120, the output device 106 may present a particular portion of the first video data 110(1) that corresponds to a portion of the activity currently being performed by the user 102. Based on the rate data 124, the first video data 110(1) may be presented in a manner that causes the instructor or other individual to appear to perform the activity at a rate within a threshold value of the rate at which the activity is being performed by the user 102. As the user 102 continues to perform the activity, additional output data 128 may cause presentation of particular portions of the first video data 110(1) at particular rates based on the movement of the user 102. For example, if the user 102 becomes desynchronized from the content presented in the first video data 110(1) or performs one or more portions of the activity incorrectly, the output data 128 may cause portions of the first video data 110(1) to be replayed or presented at a faster or slower rate. If the user 102 performs one or more portions of the activity correctly or at a threshold rate of performance, the output data 128 may cause portions of the first video data 110(1) associated with a subsequent activity or a subsequent portion of the activity to be presented.

Figure 2:
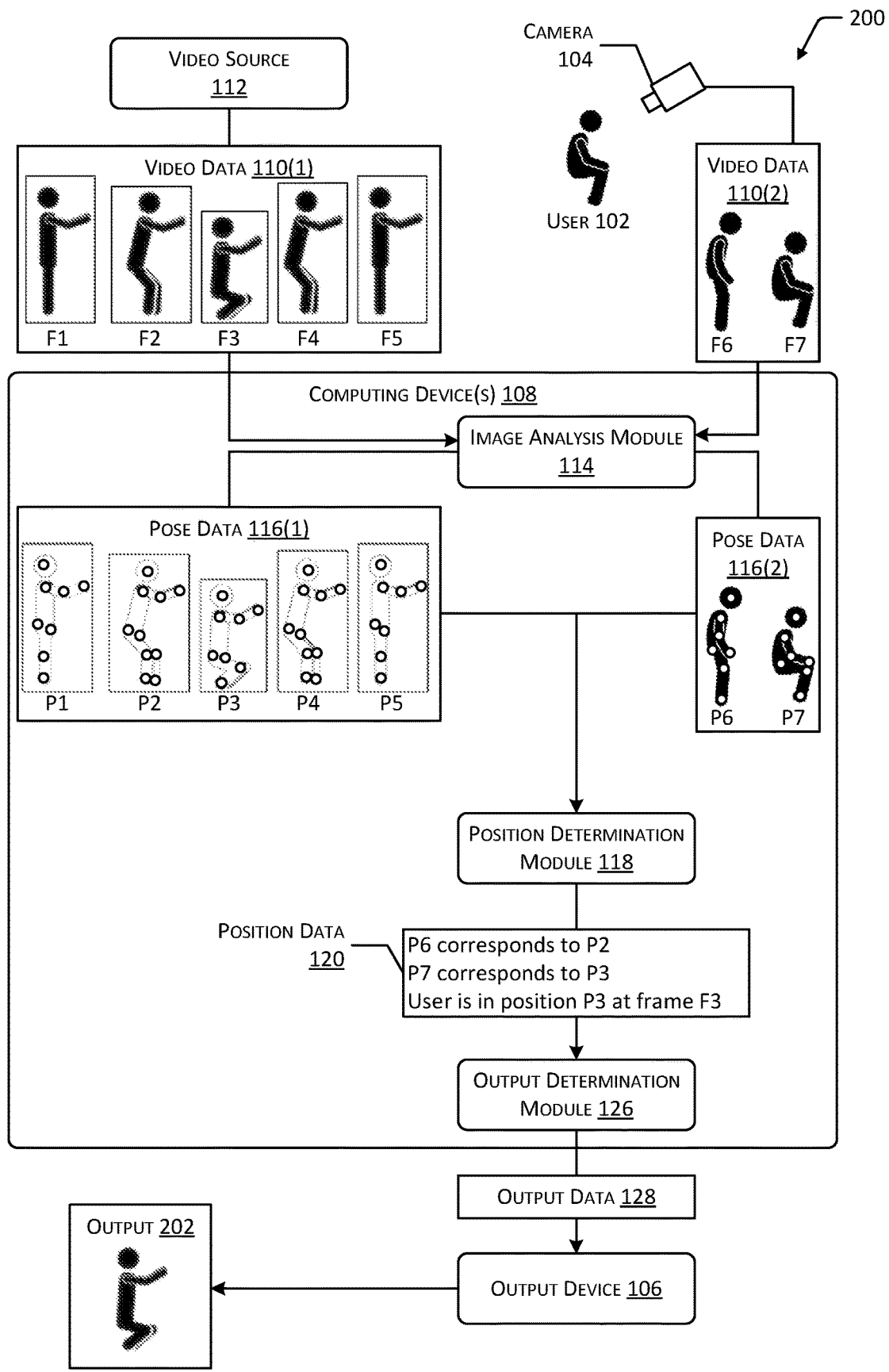
FIG. 2 is a block diagram depicting an implementation of a system for determining a portion of a video that corresponds to the movement and position of a user.

FIG. 2 is a block diagram 200 depicting an implementation of a system for determining a portion of a video that corresponds to the movement and position of a user 102. As described with regard to FIG. 1, an output device 106 associated with a user 102 may present an output 202, which may include a video output, one or more images, audio output, or other types of output. For example, the output 202 may include a video that presents an instructor or other individual performing an activity. The user 102 may attempt to perform the activity within a field of view of a camera 104 while the output 202 is presented. In some cases, the user 102 may fail to perform one or more portions of the activity correctly or may perform one or more portions of the activity at a different rate than the rate at which the activity is performed in the output 202. In such a case, the user 102 may become desynchronized from the output 202, and the portion of the video that is presented may depict an instructor or other individual in a position that differs from the position of the user 102.

FIG. 2 depicts one or more computing device(s) 108 acquiring first video data 110(1) form a video source 112. The first video data 110(1) may be used to cause presentation of the output 202. While FIG. 2 depicts the video source 112 separate from the computing device(s) 108, in other implementations, the video source 112 may be associated with a computing device 108. For example, the video source 112 may include data storage, in which the first video data 110(1) is stored, that is accessible to the computing device(s) 108. The first video data 110(1) may include multiple frames, each frame depicting an instructor or another individual in a particular position. For example, FIG. 2 depicts five example frames (F1-F5) in which an instructor is shown in different positions while performing a fitness exercise.

An image analysis module 114 associated with the computing device(s) 108 may determine first pose data 116(1) based on the first video data 110(1). The first pose data 116(1) may include one or more sets of points, each set of points representing a pose of the individual shown in the first video data 110(1) in a particular frame of the first video data 110(1). For example, FIG. 2 depicts the first pose data 116(1) including a first pose (P1) that represents a position of an instructor in the first frame (F1) of the first video data 110(1), a second pose (P2) that represents a position of the instructor in the second frame (F2), a third pose (P3) that represents a position of the instructor in the third frame (F3), a fourth pose (P4) that represents a position of the instructor in the fourth frame (F4), and a fifth pose (P5) that represents a position of the instructor in the fifth frame (F5). As described with regard to FIG. 1, in some implementations, the first pose data 116(1) may be determined prior to acquisition of the second video data 110(2) using the camera 104. For example, the first pose data 116(1) may be determined based on the first video data 110(1) at a first time and stored for future use. At a second time after the first time, the second video data 110(2) may then be acquired. In other implementations, the first pose data 116(1) may be determined during or proximate to the time at which second video data 110(2) is acquired using the camera 104 or second pose data 116(2) is generated based on the second video data 110(2).

As the user 102 performs the activity within the field of view of the camera 104, second video data 110(2) that represents the movement and positions of the user 102 may be determined. The second video data 110(2) may include multiple frames, each frame representing the user 102 in a particular position. For example, FIG. 2 depicts the second video data 110(2) including two example frames (F6-F7). The image analysis module 114 associated with the computing device(s) 108 may determine second pose data 116(2) based on the second video data 110(2). The second pose data 116(2) may include sets of points that represent a pose of the user 102 for each frame of the second video data 110(2). For example, FIG. 2 depicts the second pose data 116(2) including points representing a sixth pose (P6) of the user 102 that represents a position of the user 102 in a sixth frame (F6) of the second video data 110(2), and a seventh pose (P7) of the user 102 that represents a position of the user 102 in a seventh frame (F7) of the second video data 110(2).

The position determination module 118 associated with the computing device(s) 108 may determine correspondence between the first pose data 116(1) and the second pose data 116(2). Based on the first pose data 116(1) and the second pose data 116(2), the position determination module 118 may determine position data 120 indicative of a portion of the first video data 110(1) that corresponds to a current or future position of the user 102. For example, FIG. 2 depicts the position data 120 indicating that the sixth pose (P6) of the second pose data 116(2) corresponds to the second pose (P2) of the first pose data 116(1) and that the seventh pose (P7) of the second pose data 116(2) corresponds to the third pose (P3) of the first pose data 116(1). Based on this determination in which two subsequent poses of the first pose data 116(1) correspond to two subsequent poses the second pose data 116(2), a portion of the first video data 110(1) that represents the current or a subsequent position of the user 102 may be determined. For example, based on the sixth pose (P6) corresponding to the second pose (P2) and the seventh pose (P7) corresponding to the third pose (P3), the position data 120 may indicate that the user 102 is currently in a pose that corresponds to the third pose (P3), and during continued performance of the activity, the user 102 may achieve a pose that corresponds to the fourth pose (P4). The position data 120 may therefore indicate that the current position of the user 102 corresponds to the position shown in a corresponding frame (F3) of the first video data 110(1).

Based on the position data 120, the output determination module 126 associated with the computing device(s) 108 may provide output data 128 to the output device 106 to cause the output device 106 to present output 202 based on the portion of the first video data 110(1) indicated in the position data 120. For example, FIG. 2 depicts the output 202 as a portion of the first video data 110(1) that includes the third frame (F3), in which the instructor is shown in a position that corresponds to the position of the user 102.

Figure 3:
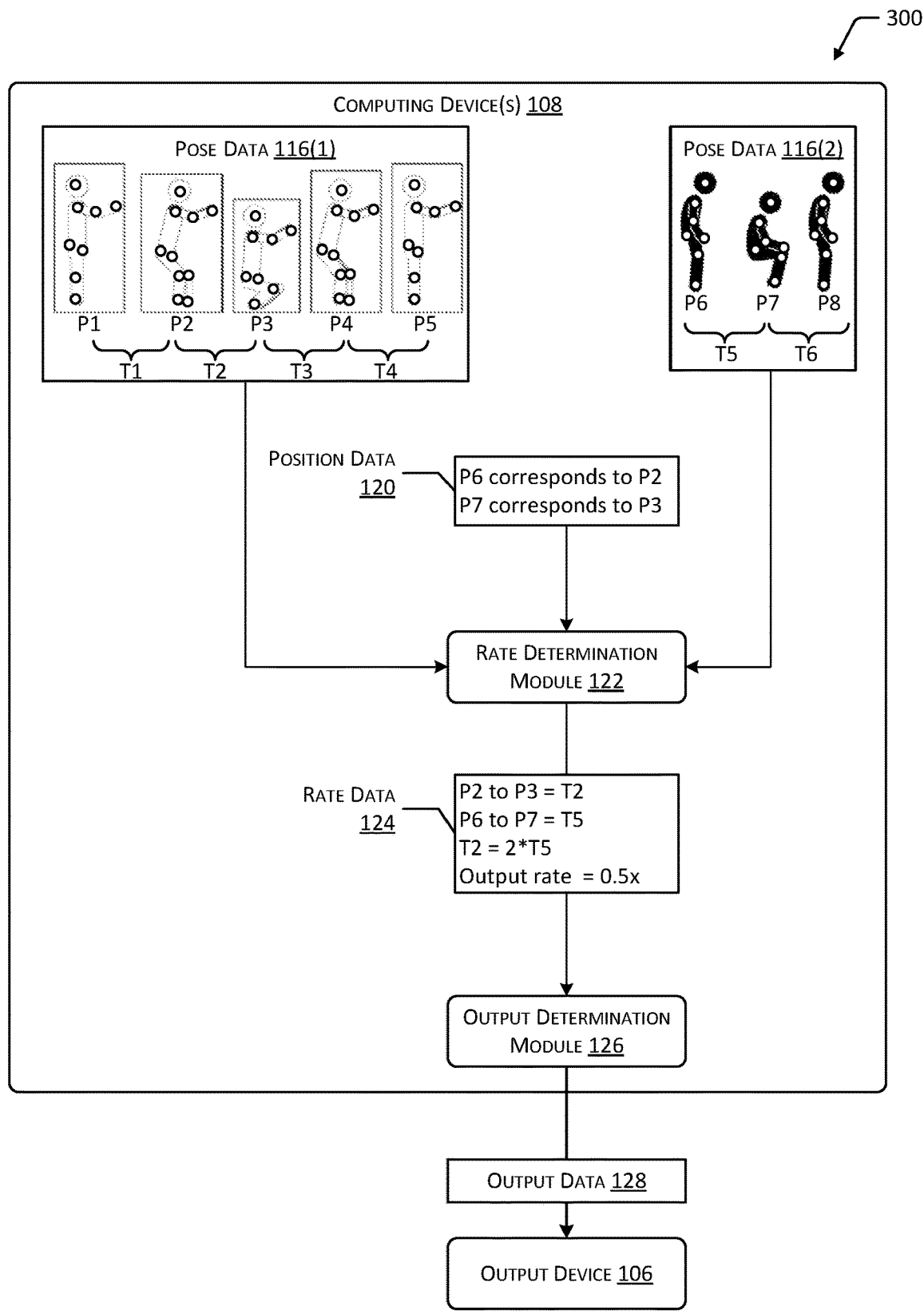
FIG. 3 is a block diagram depicting an implementation of a system for determining a rate of performance of an activity by a user and characteristics for output of a video based on the determined rate of performance.

FIG. 3 is a block diagram 300 depicting an implementation of a system for determining a rate of performance of an activity by a user 102 and characteristics for output of a video based on the determined rate of performance. As described with regard to FIGS. 1 and 2, first video data 110(1) may be accessed from a video source 112, and first pose data 116(1) may be determined based on the first video data 110(1). The first pose data 116(1) may include one or more sets of points, each set of points representing a pose of an individual depicted in the first video data 110(1) in a particular frame of the first video data 110(1). For example, FIG. 3 depicts the first pose data 116(1) including five example poses (P1-P5) of an individual.

Each pose of the first pose data 116(1) may be associated with a particular frame of the first video data 110(1) or a particular time. For example, based on the frame or time associated with a first pose (P1) and a second pose (P2), a first interval of time (T1) between the first pose (P1) and second pose (P2) may be determined. Similarly, a second interval of time (T2) between the second pose (P2) and third pose (P3), a third interval of time (T3) between the third pose (P3) and fourth pose (P4), and a fourth interval (T4) of time between the fourth pose (P4) and fifth pose (P5) may be determined. The intervals of time may be used to determine a rate of performance of an activity by an instructor or other individual represented in the first video data 110(1). For example, based on the interval of time between two subsequent poses, the rate at which an individual moves from one pose to another may be determined. Based on the intervals of time between multiple successive poses, a rate of performance for a portion of the activity may be determined. In some implementations, the first pose data 116(1) may be determined based on the first video data 110(1) independent of the acquisition of second video data 110(2) representing a user 102. For example, the first pose data 116(1) may be determined and stored for future use at a time before the second video data 110(2) is acquired. Similarly, the intervals of time between the poses represented by the first pose data 116(1) and the rate of performance of the activity by the instructor or other individual represented in the first video data 110(1) may be determined prior to acquiring the second video data 110(2). As a result, data indicative of the rate of performance associated with the first video data 110(1) may be available for use prior to the acquisition of the second video data 110(2).

As described with regard to FIGS. 1 and 2, second video data 110(2) that represents performance of an activity by a user 102 may be acquired using a camera 104. Second pose data 116(2) may be determined based on the second video data 110(2). The second pose data 116(2) may include one or more sets of points, each set of points representing a pose of the user 102 determined based on the second video data 110(2), in a particular frame of the second video data 110(2). For example, FIG. 3 depicts the second pose data 116(2) including three example poses (P6-P8). Each pose of the second pose data 116(2) may be associated with a particular frame of the second video data 110(2) or a particular time. For example, a fifth interval of time (T5) between the sixth pose (P6) and seventh pose (P7) and a sixth interval of time (T6) between the seventh pose (P7) and eighth pose (P8) may be determined. The intervals of time may be used to determine a rate at which the user 102 moves between two or more successive poses (e.g., a rate at which the user 102 performs a portion of the activity).

In some cases, if a user 102 does not perform an activity at the same rate as that of an instructor or other individual presented in a video, the movement and position of the user 102 may become desynchronized from the video, hindering comprehension of the activity by the user 102. A rate determination module 122 associated with the computing device(s) 108 may determine rate data 124 indicative of an output rate or other characteristics for presentation of the first video data 110(1) that may cause the instructor or other individual to appear to perform the activity at a rate similar to the rate at which the user 102 is performing the activity.

For example, the computing device(s) 108 may determine position data 120 indicative of a portion of the first video data 110(1) that corresponds to a current or future position of the user 102, as described with regard to FIGS. 1 and 2. The position data 120 may indicate particular poses of the first pose data 116(1) that correspond to particular poses of the second pose data 116(2). Based on the position data 120, the first pose data 116(1), and the second pose data 116(2), the rate determination module 122 may determine a relationship between the rates at which corresponding portions of the activity are performed in the first video data 110(1) and in the second video data 110(2). For example, the position data 120 may indicate that the second pose (P2) of the first pose data 116(1) corresponds to the sixth pose (P6) of the second pose data 116(2), and the third pose (P3) of the first pose data 116(1) corresponds to the seventh pose (P7) of the second pose data 116(2). An interval of time (T2) between the second pose (P2) and third pose (P3) may be indicative of a rate at which the corresponding portion of the activity is performed by an instructor or other individual in the first video data 110(1). An interval of time (T5) between the sixth pose (P6) and seventh pose (P7) may be indicative of a rate at which the corresponding portion of the activity is performed by the user 102. Based on a relationship between these intervals of time, or between the determined rate of performance of the activity, rate data 124 indicative of one or more characteristics for output of the first video data 110(1) may be determined. Based on the characteristics indicated in the rate data 124, output of the first video data 110(1) may cause an individual presented in the output 202 to appear to perform the activity at a rate within a threshold variance of the rate at which the activity is performed by the user 102.

In some implementations, the rate determination module 122 may access threshold data that may indicate a minimum or maximum rate of performance of the activity for presentation. For example, FIG. 3 depicts that the fifth time interval (T5) is twice as long as the second time interval (T2), and as a result, an output rate of 0.5× for the first video data 110(1) may cause the individual in the first video data 110(1) to appear to perform the activity at a rate similar to that of the user 102. However, threshold data may constrain the output rate for the first video data 110(1) to a particular minimum value. In such a case, the threshold minimum value may be used as the output rate for the first video data 110(1). In other implementations, a notification may be generated for presentation with the output 202. For example, a notification may indicate that the user 102 should attempt to increase the rate of performance of the activity, select a different activity, and so forth. Additionally, while FIG. 3 depicts an example in which the fifth time interval (T5) is longer than the second time interval (T2), in other cases, the user 102 may perform an activity at a faster rate than the rate at which the activity is performed in the first video data 110(1). In such a case, the output rate for the first video data 110(1) may be increased to a value greater than a native or default rate. In other implementations, a threshold maximum output rate may include the native or default rate for the first video data 110(1). In still other implementations, a threshold minimum or maximum rate of performance of an activity may be determined based on one or more characteristics of the activity. For example, video data 110 associated with a cardiovascular fitness exercise may be assigned a high threshold maximum rate of performance, while video data 110 associated with a stretching exercise may be assigned a low threshold maximum rate of performance.

The output determination module 126 associated with the computing device(s) 108 may provide output data 128 indicative of the rate data 124 to the output device 106. The output data 128 may cause the output device 106 to present output 202 in a manner that causes an individual depicted in the output 202 to perform an activity within a threshold variance of the rate at which the user 102 is performing the activity. As the rate of performance of the activity by the user 102 changes, or as the type of activity performed changes, the computing device(s) 108 may determine additional rate data 124 that may control the rate at which performance of an activity presented in an output 202 is performed.

While FIG. 3 depicts the rate determination module 122 determining a relationship between intervals of time associated with performance of corresponding portions of an activity, in other implementations, relationships between other intervals of time may be used. For example, any of the intervals of time associated with the first pose data 116(1) may be used to determine a rate of performance of the activity by an individual presented in the first video data 110(1), and any of the intervals of time associated with the second pose data 116(2) may be used to determine a rate of performance of the activity by the user 102. A relationship between the intervals of time or the determined rates of performance may be used to determine an output rate for the first video data 110(1) independent of the particular intervals of time that are used for this determination.

Figure 4A:
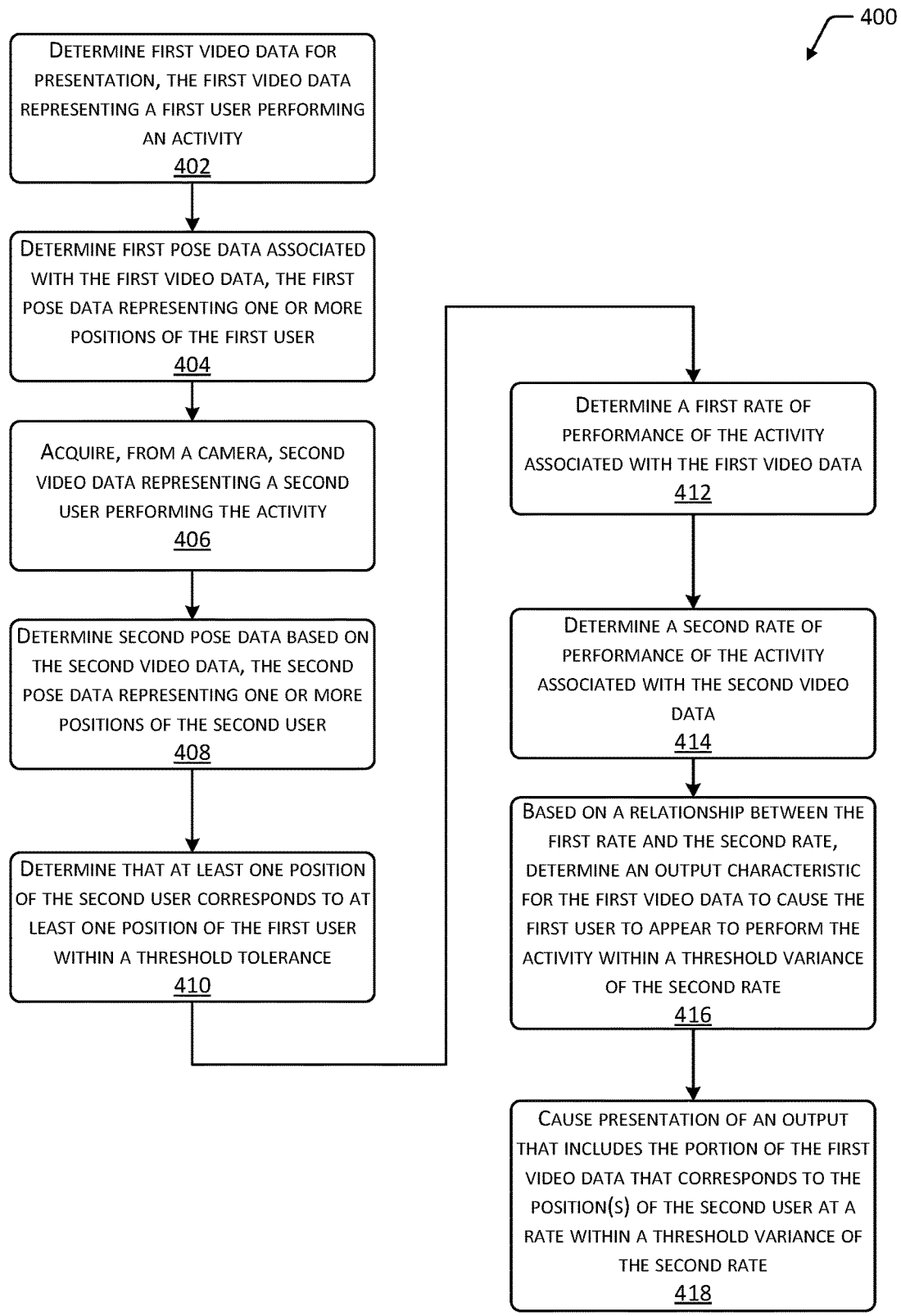
FIG. 4A is a flow diagram depicting an implementation of a method for determining a portion of a video and an output characteristic for the video based on the movement and position of a user.

FIG. 4A is a flow diagram 400 depicting an implementation of a method for determining a portion of a video and an output characteristic for the video based on the movement and position of a user 102. At 402, first video data 110(1) for presentation may be determined. The first video data 110(1) may represent a first user 102 performing an activity. For example, the first user 102 may include an instructor or other individual, and the first video data 110(1) may include instructional content for performance of the activity. In some implementations, the first video data 110(1) may be determined based on user input, such as selection of a particular video for presentation. In other implementations, the first video data 110(1) may be determined in response to user input, such as by determining that one or more characteristics of the first video data 110(1) correspond to one or more terms of a search query. In still other implementations, the first video data 110(1) may be determined in response to user data indicative of previous performance of activities, characteristics of previous performance, user preferences, physiological values or other characteristics of a user 102, and so forth. For example, first video data 110(1) associated with a fitness exercise having a high intensity or difficulty may be determined in response to user data indicating successful previous performance of difficult fitness exercises, physiological values of a user 102, and so forth. In still other implementations, the first video data 110(1) may be determined based on correspondence between the first video data 110(1) and second video data 110(2) acquired from a camera 104, as described with regard to FIG. 4B. For example, a user 102 may begin to perform an activity within a field of view of a camera 104, and pose data 116 representing one or more positions of the user 102 may be compared to pose data 116 for one or more existing videos to determine video data 110 that corresponds to the movements and positions of the user 102.

At 404, first pose data 116(1) associated with the first video data 110(1) may be determined. The first pose data 116(1) may represent one or more positions of the first user 102. For example, one or more object recognition or segmentation algorithms may be used to identify portions of frames of video data 110(1) in which the first user 102 is visible. An object recognition algorithm, or another type of algorithm, may determine portions of frames of the first video data 110(1) that correspond to particular body parts of the first user 102. The first pose data 116(1) may represent the locations and orientations of one or more body parts of the first user 102 as a set of points, which may be constrained by the locations of one or more other points based on a set of rules. The first pose data 116(1) may also include data indicative of a frame or time associated with one or more poses represented by the first pose data 116(1). In some implementations, the first pose data 116(1) may be determined based on the first video data 110(1) independent of the actions of other users 102 or the acquisition of other video data 110. For example, after receipt or generation of the first video data 110(1), the first pose data 116(1) may be determined and stored in association with the first video data 110(1) for future use, before acquisition of subsequent video data 110(2) associated with a user 102. In some implementations, data indicative of a rate of performance of the activity may be determined based on the pose data 116 and may also be stored in association with the first video data 110(1). Additionally, in some implementations, data indicative of a difficulty, a type of activity, or one or more characteristics of the activity may be determined and stored in association with the first video data 110(1).

At 406, second video data 110(2) may be acquired from a camera 104. The second video data 110(2) may represent a second user 102 performing the activity. For example, a second user 102 viewing an output 202 associated with the first video data 110(1) may attempt to perform the activity shown in the output 202 within a field of view of a camera 104.

At 408, second pose data 116(2) may be determined based on the second video data 110(2). The second pose data 116(2) may represent one or more positions of the second user 102. In some implementations, one or more object recognition or segmentation algorithms may be used to identify portions of frames of the second video data 110(2) in which the second user 102 is visible. An object recognition algorithm, or another type of algorithm, may determine portions of frames of the second video data 110(2) that correspond to particular body parts of the second user 102. The locations and orientations of one or more body parts of the second user 102 may be represented as a set of points, in which each point may be constrained by the locations of one or more other points based on a set of rules. The second pose data 116(2) may also include data indicative of a frame or time associated with one or more poses represented by the second pose data 116(2).

At 410, at least one position of the second user 102 that corresponds to at least one position of the first user 102, within a threshold tolerance, may be determined. As described with regard to FIGS. 1 and 2, correspondence between the first pose data 116(1), indicative of the positions of the body of a first user 102 in the first video data 110(1), and the second pose data 116(2), indicative of the positions of the body of the second user 102 may be determined. Based on this correspondence, particular positions of the second user 102 that are within a threshold tolerance of particular positions of the first user 102 may be determined. The corresponding positions may be used to determine a portion of the first video data 110(1) in which the body of the first user 102 is shown in the same position as a current position of the body of the second user 102. In some implementations, correspondence between multiple poses of the second pose data 116(2) and multiple poses of the first pose data 116(1) may be determined. For example, during performance of an activity, the first user 102 may achieve identical or similar positions at multiple times. In such a case, a single position of the body of the second user 102 may correspond to multiple possible positions represented in the first pose data 116(1). However, correspondence between multiple positions of the second pose data 116(2) and multiple positions of the first pose data 116(1) may be used to determine a unique portion of the first pose data 116(1) that corresponds to the second pose data 116(2). The corresponding poses may then be used to determine a specific portion of the first video data 110(1) that represents the portion of an activity that is currently being performed by the second user 102. In some cases, determination of the portion of the first video data 110(1) may be delayed until a unique portion of the first pose data 116(1) that corresponds to the second pose data 116(2) is determined.

At 412, a first rate of performance of the activity associated with the first video data 110(1), may be determined. As described with regard to FIG. 3, each pose of the first pose data 116(1) may be associated with a particular frame of the first video data 110(1) or a particular time. Therefore, one or more intervals of time between a particular pose and one or more subsequent poses may be used to determine a rate at which the activity is performed by the first user 102. For example, based on the interval of time between two subsequent poses, the rate at which the first user 102 moves from one pose to another may be determined. Based on the intervals of time between multiple successive poses, a rate of performance for a portion of the activity may be determined.

At 414, a second rate of performance of the activity associated with the second video data 110(2) may be determined. For example, a second user 102 within a field of view of a camera 104 may not perform an activity at the same rate as the first user 102 presented in an output 202 based on the first video data 110(1). In such a case, the movement and position of the second user 102 may become desynchronized from the output 202. The second pose data 116(2) may be used to determine the rate of performance of the activity by the second user 102 based on intervals of time between one or more poses. For example, each pose of the second pose data 116(2) may be associated with a particular frame of the second video data 110(2) or a particular time. The intervals of time may be used to determine a rate at which the second user 102 moves between two or more successive poses, and therefore a rate at which the second user 102 performs a portion of the activity.

At 416, based on a relationship between the first rate and the second rate, an output characteristic for the first video data 110(1) may be determined. The output characteristic may cause the first user 102 to appear to perform the activity within a threshold variance of the second rate associated with the second user 102. For example, the output characteristic may include a playback or output rate for the first video data 110(1) that may cause the first user 102, presented in an output 202, to appear to perform the activity at a rate similar to the rate at which the second user 102 is performing the activity. In some cases, the playback or output rate, or one or more other characteristics of the output 202, may be constrained by one or more threshold values. For example, a threshold minimum or maximum rate associated with the first video data 110(1) or with the activity may limit the playback or output rate for the first video data 110(1).

At 418, presentation of an output 202 may be caused. The output 202 may include the portion of the first video data 110(1) that corresponds to the determined position(s) of the second user 102, described with regard to block 410. The output 202 may also include presentation of the portion of the first video data 110(1) at a rate that is within a threshold variance of the second rate of performance of the activity, described with regard to blocks 414 and 416. As a result, the second user 102 may be provided with an output 202 in which the first user 102 is presented in a similar position, corresponding to the same portion of the activity that is being performed by the first user 102, while performing an activity at a similar rate to that of the first user 102.

Figure 4B:
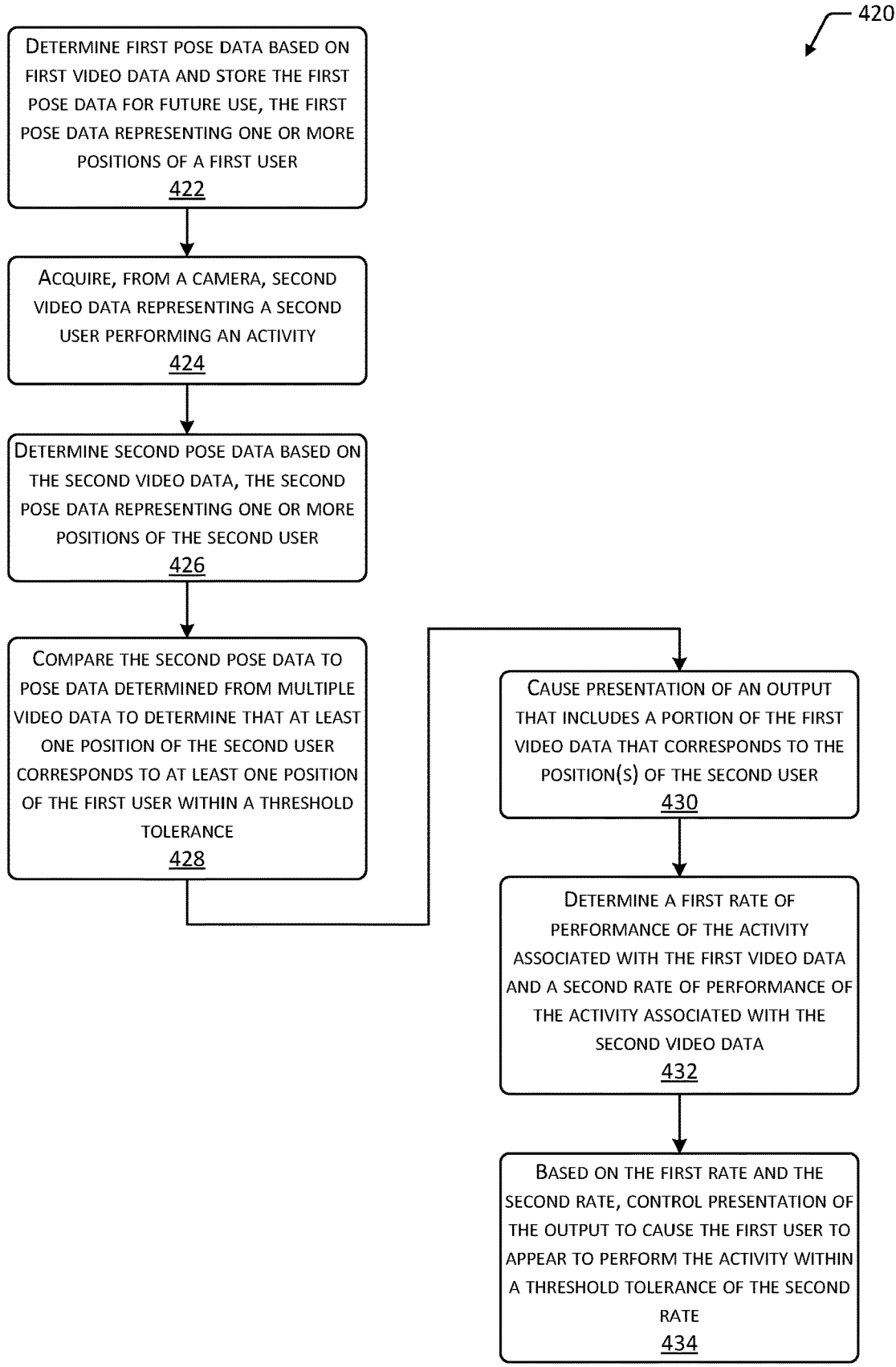
FIG. 4B is a flow diagram depicting an implementation of a method for determining a video for output based on video data determined from a user and synchronizing output of the video based on the movements and positions of the user.

FIG. 4B is a flow diagram 420 depicting an implementation of a method for determining a video for output based on video data 110 determined from a user 102 and synchronizing output of the video based on the movements and positions of the user 102. At 422, first pose data 116(1) may be determined based on first video data 110(1). The first pose data 116(1) may be stored for future use. As described with regard to FIGS. 1-4A, the first pose data 116(1) may represent one or more positions of a first user 102. For example, the first video data 110(1) may depict an instructor or other user 102 performing an activity, such as a fitness exercise. The first video data 110(1) and first pose data 116(1) may be stored in a video source 112 that may contain other video data 110 and other pose data 116.

At 424, second video data 110(2) may be acquired from a camera 104. The second video data 110(2) may represent a second user 102 performing an activity. At 426, second pose data 116(2) may be determined based on the second video data 110(2), the second pose data 116(2) representing one or more positions of the second user 102.

As described previously, in some implementations, a user 102 may begin performing in activity within a field of view of a camera 104. The movements and positions of the user 102 may be compared to the pose data 116 associated with multiple stored videos to determine particular video data 110 that may correspond to the movements and positions of the user 102. For example, at 428, the second pose data 116(2) may be compared to pose data 116 determined from multiple video data 110. At least one position of the second user 102 may be determined to correspond to at least one position of the first user 102 from the first video data 110(1) within a threshold tolerance.

At 430, presentation of an output 202 may be caused. The output 202 may include a portion of the first video data 110(1) that corresponds to the position(s) of the second user 102. For example, when the second user 102 begins performing an activity within the field of view of the camera 104, correspondence between the first pose data 116(1) and second pose data 116(2) may be used to determine that at least a portion of the first video data 110(1) includes similar positions or movements to those performed by the second user 102. The output 202 may present the portion of the first video data 110(1) associated with a current position of the second user 102, determined based on the second pose data 116(2).

At 432, a first rate of performance of the activity associated with the first video data 110(1) and a second rate of performance of the activity associated with the second video data 110(2) may be determined. For example, based on the interval of time between two multiple poses, the rates at which the first user 102 and second user 102 move from one pose to another may be determined. At 434, based on the determined first rate and second rate, presentation of the output 202 may be controlled to cause the first user 102 to appear to perform the activity within a threshold tolerance of the second rate at which the second user 102 performs the activity within the field of view of the camera 104.

Figure 5:
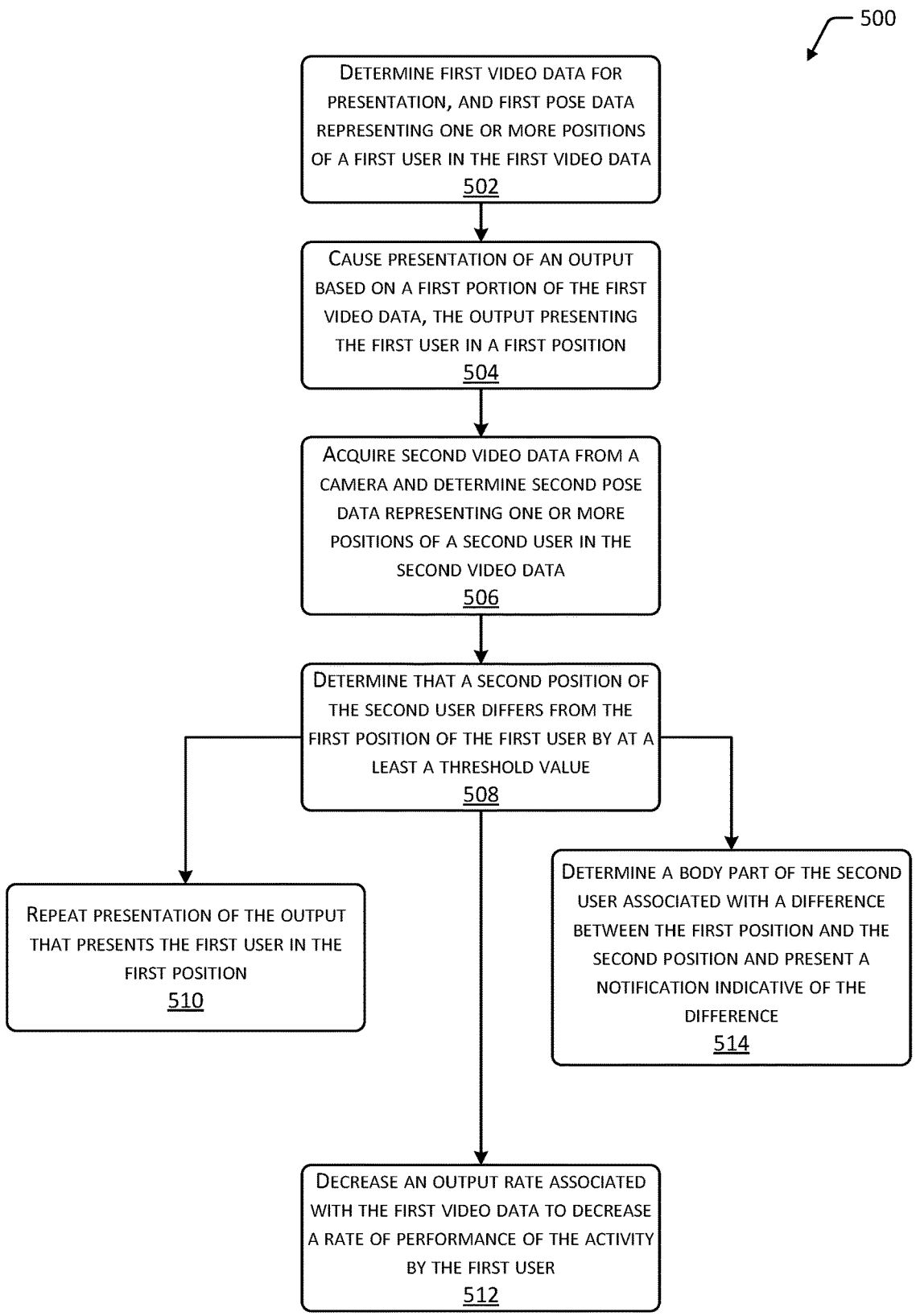
FIG. 5 is a flow diagram depicting an implementation of a method for determining characteristics of an output for presentation based on differences between a position of a user and a position presented in a video.

FIG. 5 is a flow diagram 500 depicting an implementation of a method for determining characteristics of an output 202 for presentation based on differences between a position of a user 102 and a position presented in a video. At 502, first video data 110(1) may be determined for presentation. First pose data 116(1) representing one or more positions of a first user 102 in the first video data 110(1) may also be determined. For example, the first video data 110(1) may represent an instructor or other individual performing an activity. In each frame of the first video data 110(1) in which the first user 102 is depicted, the first pose data 116(1) may represent the position of the body of the first user 102 as a set of points.

Block 504 may cause presentation of an output 202 based on a first portion of the first video data 110(1). The output 202 may present the first user 102 in a first position. For example, an output device 106 associated with a second user 102 may present output 202 in which the first user 102 performs an activity to assist the second user 102 in performance of the activity.

At 506, second video data 110(2) may be acquired from a camera 104. Second pose data 116(2) may be determined based on the second video data 110(2). The second pose data 116(2) may represent one or more positions of a second user 102. For example, the second user 102 may perform the activity presented in the output 202 within a field of view of a camera 104. The camera 104 may acquire the second video data 110(2), which may depict the position(s) of the second user 102 during performance of the activity.

At 508, a determination may be made that a second position of the second user 102 differs from a first position of the first user 102 by at least a threshold value. For example, one or more computing devices 108 may determine correspondence between the first pose data 116(1), which represents positions of the first user 102, and the second pose data 116(2), which represents positions of the second user 102. In cases where a position of the second user 102 differs from a corresponding position of the first user 102, this may indicate improper performance of the activity by the second user 102. For example, if the second user 102 experiences difficulty comprehending a portion of an activity or difficulty performing a portion of the activity, the position of the second user 102 may differ from a position of the first user 102 presented in an output 202. In such a case, the second user 102 may be assisted by replaying one or more portions of the first video data 110(1), reducing a rate at which the first video data 110(1) is presented, or presenting one or more notifications indicative of the difference between the first position and the second position. Automatic performance of one or more of these functions may avoid the need for manual manipulation of the output 202 by the second user 102, such as to replay portions of the first video data 110(1) or to adjust an output rate of the first video data 110(1).

For example, at 510, presentation of the output 202 that presents the first user 102 in the first position may be repeated. Continuing the example, the difference between the second position and the first position, described with regard to block 508, may indicate an error in performance of the activity by the second user 102. In such a case, repeating presentation of a portion of the output 202 may enable the second user 102 to determine the error and correctly perform the activity.

As another example, at 512, an output rate associated with the first video data 110(1) may be decreased to decrease a rate of performance of the activity by the first user 102 presented in the output 202. For example, the difference between the second position and the first position, described with regard to block 508, may indicate desynchronization between the second user 102 and the output 202, or difficulty by the second user 102 in performance of the activity. In such a case, selecting characteristics for presentation of the output 202 that reduce the rate at which the activity is performed in the output 202 may enable the second user 102 to perform the activity at a rate similar to that presented in the output 202.

As another example, at 514, a body part of the second user 102 that is associated with the difference between the first position and the second position may be determined, and a notification indicative of the difference may be presented. For example, the output 202 may include a notification indicating a particular body part of the second user 102 that differs from the position of a corresponding body part of the first user 102 presented in the output 202. Presentation of the notification may enable the second user 102 to identify the difference between the first position and the second position and correctly perform the activity.

While FIG. 5 depicts blocks 510, 512, and 514 as separate functions, in some implementations, more than one of the functions described with regard to blocks 510, 512, or 514 may be performed. Additionally, in some implementations, in response to a deviation between a position of the second user 102 and a position of the first user 102, a rate of performance of the second user 102 and a threshold rate of performance, or a physical value determined using one or more sensors associated with the second user 102 and a threshold physiological value, an output 202 associated with a different activity or different portion of the activity may be presented, or a recommendation for such an output 202 may be presented.

Figure 6:
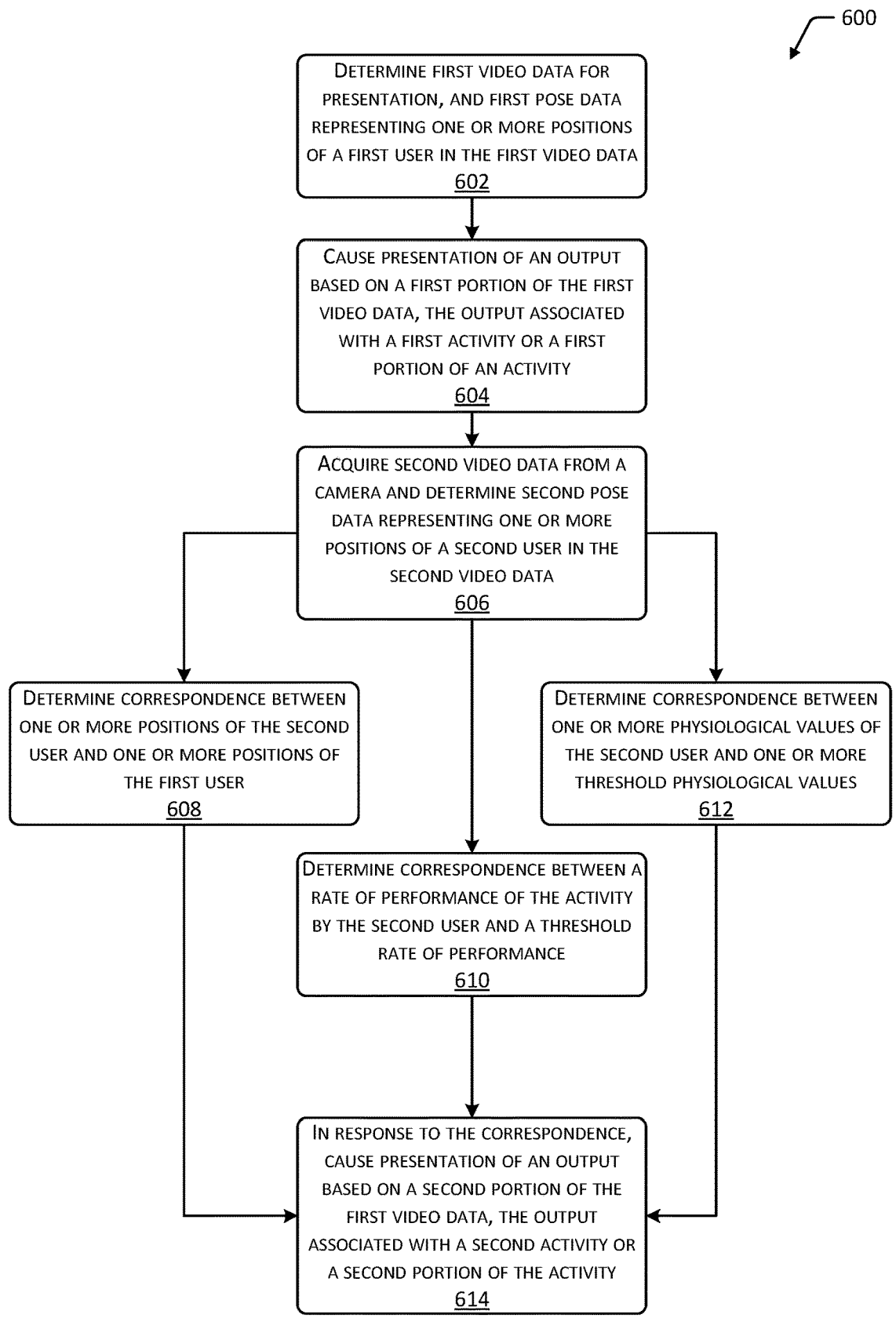
FIG. 6 is a flow diagram depicting an implementation of a method for determining outputs for presentation based on the positions, rates of movement, or physiological values associated with a user.

FIG. 6 is a flow diagram 600 depicting an implementation of a method for determining outputs 202 for presentation based on the positions, rates of movement, or physiological values associated with a user 102. At 602, first video data 110(1) may be determined for presentation. First pose data 116(1) representing one or more positions of a first user 102 in the first video data 110(1) may also be determined. In each frame of the first video data 110(1) in which the first user 102 is depicted, the first pose data 116(1) may indicate the position of the body of the first user 102.

Block 604 may cause presentation of an output 202 based on a first portion of the first video data 110(1). The output 202 may be associated with a first activity or a first portion of an activity. For example, the first video data 110(1) may be associated with multiple activities, or an activity having multiple parts or portions. An output 202 associated with a first activity or a first portion may be presented prior to presentation of an output 202 associated with a subsequent activity or subsequent portion. The movement, position, or other characteristics of a user 102 may determine the manner in which subsequent output 202 is presented.

At 606, second video data 110(2) may be acquired from a camera 104. Second pose data 116(2) may be determined based on the second video data 110(2). The second pose data 116(2) may represent one or more positions of a second user 102. For example, the second user 102 may perform the first activity or the first portion of the activity that is presented in the output 202 within a field of view of a camera 104.

At 608, correspondence between one or more positions of the second user 102 and one or more positions of the first user 102 may be determined. For example, as described with regard to FIGS. 1 and 2, correspondence between the first pose data 116(1), indicative of the positions of the body of the first user 102 in the first video data 110(1), and the second pose data 116(2), indicative of the positions of the body of the second user 102, may be determined. Based on the first pose data 116(1) and the second pose data 116(2), it may be determined that the body of the second user 102 is in a position that is within a threshold similarity of the position of the first user 102 presented in the output 202. In some cases, this correspondence may indicate correct performance of an activity by the second user 102, completion of an activity or portion of an activity by the second user 102, and so forth.

At 610, correspondence between a rate of performance of the activity by the second user 102 and a threshold rate of performance may be determined. For example, as described with regard to FIGS. 1 and 3, times at which the second user 102 achieves particular poses may be used to determine a rate of performance of the activity. In some implementations, this rate of performance may be used to determine an output rate for the first video data 110(1) that may cause the first user 102 to appear to perform the activity at a similar rate to that of the second user 102. However, in other cases, the rate of performance of the activity by the second user 102 may indicate correct performance of an activity, comprehension or mastery of the activity, that the difficulty level associated with the activity is not suitable for the second user 102, and so forth.

At 612, correspondence between one or more physiological values of the second user 102 and one or more threshold physiological values may be determined. For example, one or more sensors associated with the second user 102 may determine sensor data indicative of a heart rate, respiratory rate, a blood pressure, or other physiological values. A threshold physiological value may correspond to a target value, such as a target heart rate associated with a fitness exercise. In other cases, a threshold physiological value may correspond to a minimum or maximum value. For example, if a heart rate of the second user 102 is less than a minimum value or greater than a maximum value, this may indicate that a difficulty level associated with an activity is not suitable for the second user 102.

In response to the correspondence, described with regard to blocks 608, 610, and 612, block 614 may cause presentation of an output 202 based on a second portion of the first video data 110(1). The output 202 may be associated with a second activity or a second portion of the activity. For example, in response to data indicative of proper performance of an activity, completion of an activity, achievement of a target rate of performance of physiological value, and so forth, output 202 corresponding to a subsequent activity or portion of an activity may be presented. While FIG. 6 depicts blocks 608, 610, and 612 as separate functions, in some implementations, more than one of the functions described with regard to blocks 608, 610, and 612 may be performed. For example, a subsequent output 202 may be presented in response to both a rate of performance of the second user 102 and a physiological value of the second user 102.

Figure 7:
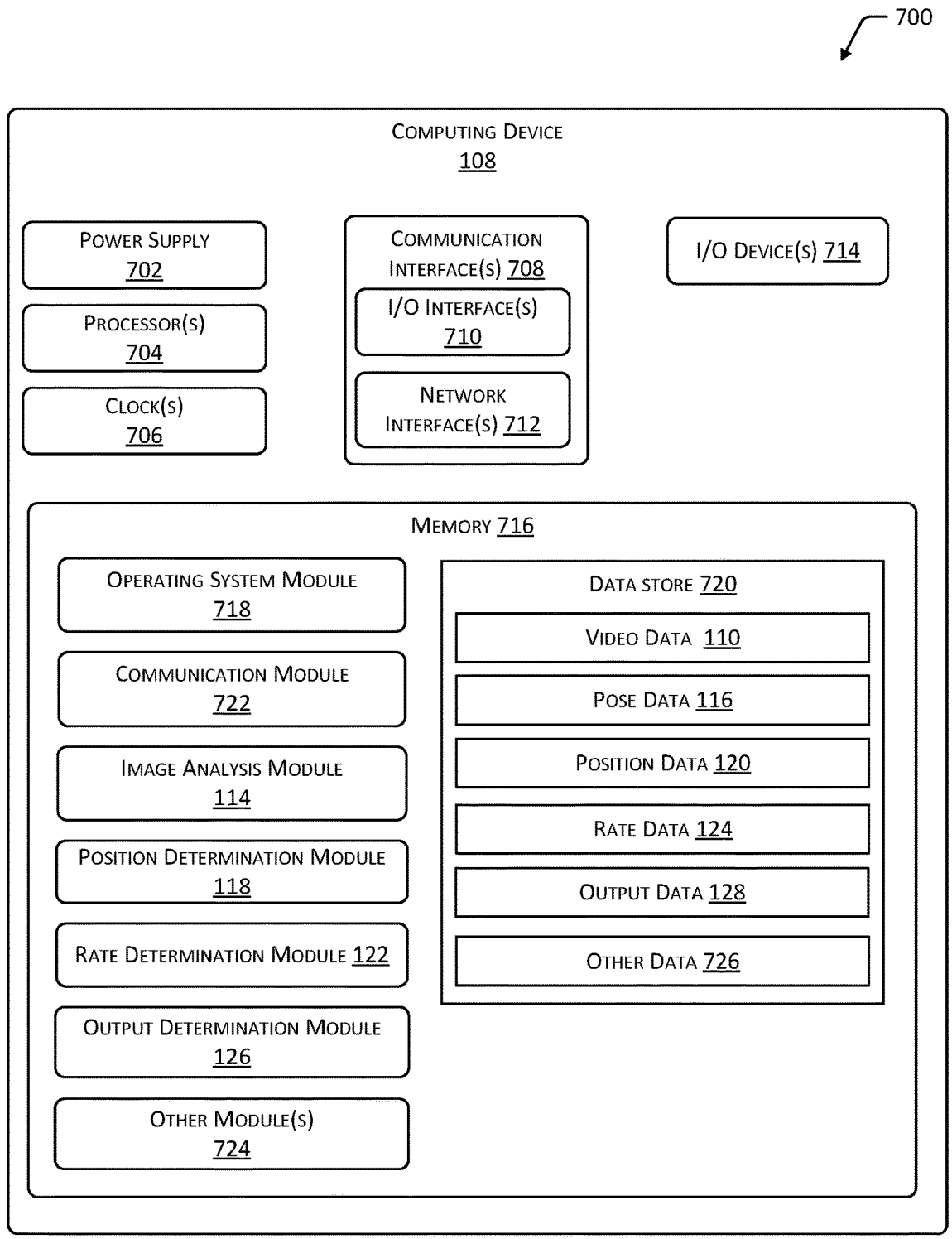
FIG. 7 is a block diagram illustrating an implementation of a computing device within the present disclosure.

FIG. 7 is a block diagram 700 illustrating an implementation of a computing device 108 within the present disclosure. As described with regard to FIG. 1, the computing device 108 may include a server, a computing device 108 having an integrated camera 104 such as a smartphone, or any other personal computing device, mobile computing device, portable computing device, and so forth. Additionally, while FIG. 7 depicts a single block diagram 700 of a computing device 108, any number and any type of computing devices 108 may be used to perform the functions described herein.

One or more power supplies 702 may be configured to provide electrical power suitable for operating the components of the computing device 108. In some implementations, the power supply 702 may include a rechargeable battery, fuel cell, photovoltaic cell, power conditioning circuitry, and so forth.

The computing device 108 may include one or more hardware processor(s) 704 (processors) configured to execute one or more stored instructions. The processor(s) 704 may include one or more cores. One or more clock(s) 706 may provide information indicative of date, time, ticks, and so forth. For example, the processor(s) 704 may use data from the clock 706 to generate a timestamp, trigger a preprogrammed action, determine rates of performance of activities presented in video data 110, and so forth.

The computing device 108 may include one or more communication interfaces 708, such as input/output (I/O) interfaces 710, network interfaces 712, and so forth. The communication interfaces 708 may enable the computing device 108, or components of the computing device 108, to communicate with other computing devices 108 or components of the other computing devices 108. The I/O interfaces 710 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include any manner of input devices or output devices associated with the computing device 108. For example, I/O devices 714 may include touch sensors, displays, touch sensors integrated with displays (e.g., touchscreen displays), keyboards, mouse devices, microphones, image sensors, cameras (e.g., RGB cameras, RGB-D cameras, or other types of cameras), scanners, speakers or other types of audio output devices, haptic devices, printers, and so forth. I/O devices 714 may also include one or more sensors for generating data based on physiological values of a user 102, such as a heart rate, blood pressure, respiratory rate, and so forth. In some implementations, the I/O devices 714 may be physically incorporated with the computing device 108. In other implementations, I/O devices 714 may be externally placed.

The network interfaces 712 may be configured to provide communications between the computing device 108 and other devices, such as the I/O devices 714, routers, access points, and so forth. The network interfaces 712 may include devices configured to couple to one or more networks including local area networks (LANs), wireless LANs (WLANs), wide area networks (WANs), wireless WANs, and so forth. For example, the network interfaces 712 may include devices compatible with Ethernet, Wi-Fi, Bluetooth, ZigBee, Z-Wave, 3G, 4G, 5G, LTE, and so forth.

The computing device 108 may include one or more busses or other internal communications hardware or software that allows for the transfer of data between the various modules and components of the computing device 108.

As shown in FIG. 7, the computing device 108 may include one or more memories 716. The memory 716 may include one or more computer-readable storage media (CRSM). The CRSM may be any one or more of an electronic storage medium, a magnetic storage medium, an optical storage medium, a quantum storage medium, a mechanical computer storage medium, and so forth. The memory 716 may provide storage of computer-readable instructions, data structures, program modules, and other data for the operation of the computing device 108. A few example modules are shown stored in the memory 716, although the same functionality may alternatively be implemented in hardware, firmware, or as a system on a chip (SoC).

The memory 716 may include one or more operating system (OS) modules 718. The OS module 718 may be configured to manage hardware resource devices such as the I/O interfaces 710, the network interfaces 712, the I/O devices 714, and to provide various services to applications or modules executing on the processors 704. The OS module 718 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 720 and one or more of the following modules may also be associated with the memory 716. The modules may be executed as foreground applications, background tasks, daemons, and so forth. The data store(s) 720 may use a flat file, database, linked list, tree, executable code, script, or other data structure to store information. In some implementations, the data store(s) 720 or a portion of the data store(s) 720 may be distributed across one or more other devices including other computing devices 108, network attached storage devices, and so forth.

A communication module 722 may be configured to establish communications with one or more other computing devices 108. Communications may be authenticated, encrypted, and so forth.

The memory 716 may also store the image analysis module 114. The image analysis module 114 may determine pose data 116 based on stored or acquired video data 110. In some implementations, the image analysis module 114 may include one or more object recognition or segmentation algorithms that may identify portions of frames of video data 110 in which a user 102 is visible. In some implementations, the image analysis module 114 may use one or more object recognition algorithms, or other techniques, to determine portions of frames of video data 110 that correspond to particular body parts of a user 102. Pose data 116 may represent the determined positions of parts of a body as a set of points. The locations and orientations of one or more points may be constrained by the location of one or more other points based on a set of rules. In some implementations, each point of a pose may associate an identifier of the point with a particular location or orientation of the point. In some implementations, data regarding a point may also indicate movement of the point, a confidence value associated with the location of the point, and so forth. In some implementations, the pose data 116 may also include segmentation information, shape information, information regarding a three-dimensional position of an individual or other object, and so forth. The pose data 116(1) may also include data indicative of a frame or relative time associated with one or more poses represented by the pose data 116.

The memory 716 may additionally store the position determination module 118. The position determination module 118 may determine correspondence between different sets of pose data 116, determined from different video data 110, to determine particular positions of a first user 102 that correspond to positions of a second user 102. Based on this determination, a portion of first video data 110(1) that corresponds to the position of the body of a user 102 represented in second video data 110(2) may be determined. In some cases, the position determination module 118 may determine multiple corresponding poses between sets of pose data 116. For example, during performance of an activity, a first user 102 represented in the first video data 110(1) may achieve identical or similar positions at multiple times. In such a case, a single position of the body of a second user 102 represented in second video data 110(2) may correspond to multiple possible positions presented in the first video data 110(1). Therefore, correspondence between multiple positions may be used to determine a specific (e.g., unique) portion of the first video data 110(1) that corresponds to a specific portion of the second video data 110(2).

The memory 716 may also store the rate determination module 122. The rate determination module 122 may determine an output rate or other characteristics for presentation of an output 202 based on video data 110. The rate determination module 122 may determine a rate of performance of an activity represented in first video data 110(1) based on pose data 116(1) determined based on the first video data 110(1). For example, based on one or more intervals of time between portions of the first video data 110(1) associated with successive positions, a rate of performance of an activity represented by the first video data 110(1) may be determined. In a similar manner, a second rate of performance may be determined based on pose data 116(2) associated with second video data 110(2). Based on a relationship between the rate of performance represented by the first video data 110(1) and the rate of performance represented by the second video data 110(2), an output rate or other characteristic for presentation of the first video data 110(1) may be determined that may cause the rate of performance associated with the first video data 110(1) to be within a threshold similarity of the rate of performance associated with the second video data 110(2).

The memory 716 may store the output determination module 126. The output determination module may determine output data 128 based on the video data 110, position data 120 determined using the position determination module 118, and rate data 124 determined using the rate determination module 122. The output data 128 may cause an output device 106 to present output 202 based on a portion of video data 110 indicated in the position data 120, having one or more output characteristics indicated in the rate data 124. For example, based on the position data 120, the output device 106 may present a particular portion of the video data 110 that corresponds to a portion of the activity currently being performed by a user 102. Based on the rate data 124, the video data 110 may be presented in a manner that causes an individual to appear to perform the activity at a rate within a threshold value of the rate at which the activity is being performed by the user 102.

Other modules 724 may also be present in the memory 716. For example, other modules 724 may include permission or authorization modules to enable a user 102 to provide authorization to acquire video data 110 of the user 102. For users 102 that do not opt-in or otherwise authorize acquisition of video data 110 that depicts the user 102, generation, transmission, or use of such video data 110 may be prevented. Other modules 724 may also include encryption modules to encrypt and decrypt communications between computing devices 108, authentication modules to authenticate communications sent or received by computing devices 108, a permission module to assign, determine, and manage user permissions to access or modify data associated with computing devices 108, user interface modules to generate interfaces for receiving input from users 102, such as selection of video data 110 for presentation, and so forth. Other modules 724 may also include modules for acquiring data using physiological sensors.

Other data 726 within the data store(s) 720 may include configurations, settings, preferences, and default values associated with computing devices 108. Other data 726 may also include encryption keys and schema, access credentials, and so forth. Other data 726 may additionally include audio files for output, such as during performance of activities by a user 102. Other data 726 may include threshold data, such as threshold rates of performance of an activity, threshold physiological values, and so forth.

In different implementations, different computing devices 108 may have different capabilities or capacities. For example, servers may have greater processing capabilities or data storage capacity than smartphones or other portable computing devices 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
access first video data that represents an instructor performing an activity;
determine, based on the first video data, first pose data indicative of: a first position of the instructor at a first time, a second position of the instructor at a second time after the first time, and a third position of the instructor at a third time after the second time;
acquire, from a camera, second video data that represents a participant performing the activity;
determine, based on the second video data, second pose data indicative of:
a fourth position of the participant at a fourth time, and
a fifth position of the participant at a fifth time after the fourth time;
determine a correspondence that indicates one or more of: the first position and the fourth position correspond within a first threshold value, or the second position and the fifth position correspond within a second threshold value; and
in response to the correspondence, at a sixth time after the fifth time, cause an output device associated with the participant to present output associated with a portion of the first video data that represents the instructor in the third position.

2. The system of claim 1, further comprising computer-executable instructions to:
determine a first interval of time between the fourth time and the fifth time, wherein the first interval is indicative of a first rate of movement of the participant from the fourth position to the fifth position;
determine a second interval of time between the first time and the second time, wherein the second interval is indicative of a second rate of movement of the instructor from the first position to the second position; and
determine, based on a relationship between the first interval of time and the second interval of time, an output rate for presentation of the output to cause an appearance of the instructor moving at the first rate of movement.

3. The system of claim 1, further comprising computer-executable instructions to:
determine, based on the second video data, third pose data indicative of a sixth position of the participant at the sixth time;
determine a difference between the sixth position and the third position; and
in response to the difference, cause the output device to repeat presentation of the output associated with the portion of the first video data that represents the instructor in the third position.

4. A method comprising:
accessing first video data representing a first user performing a first activity;
determining, based on the first video data, first pose data representing a first position of the first user at a first time;
acquiring, using a camera, second video data representing a second user performing the first activity;
determining, based on the second video data, second pose data representing a second position of the second user at a second time;
determining that the second position corresponds to the first position within a first threshold value; and
in response to the second position corresponding to the first position within the first threshold value, providing third video data to an output device associated with the second user, wherein the third video data represents a third position of the first user at a third time subsequent to the first time.

5. The method of claim 4, further comprising:
determining, based on the first video data, third pose data representing a fourth position of the first user at a fourth time subsequent to the first time;
determining, based on the second video data, fourth pose data representing a fifth position of the second user at a fifth time subsequent to the second time; and
determining that the fourth position corresponds to the fifth position within the first threshold value, wherein the third video data is provided to the output device further in response to the fourth position corresponding to the fifth position within the first threshold value.

6. The method of claim 4, further comprising:
determining, based on the second video data, third pose data representing a fourth position of the second user at a fourth time subsequent to the second time;
determining a first duration of a first interval of time between the second time and the fourth time; and
determining, based on the first duration, an output rate for presentation of the third video data by the output device.

7. The method of claim 6, further comprising:
determining, based on the first video data, fourth pose data representing a fifth position of the first user at a fifth time subsequent to the first time;
determining a second duration of a second interval of time between the first time and the fifth time; and
determining a relationship between the first duration and the second duration, wherein the output rate is determined based on the relationship.

8. The method of claim 4, further comprising:
determining, based on the second video data, third pose data representing a fourth position of the second user at a fourth time subsequent to the second time;
determining a rate of movement of the second user based on the second time and the fourth time;
determining that the rate of movement is within a second threshold value of a threshold rate of movement; and
in response to the rate of movement being within the second threshold value of the threshold rate of movement, providing fourth video data to the output device, wherein the fourth video data represents one or more of the first user or a third user performing a second activity.

9. The method of claim 4, further comprising:
acquiring sensor data from a sensor associated with the second user;
determining, based on the sensor data, a physiological value associated with the second user;
determining that the physiological value is within a second threshold value of a threshold physiological value; and
in response to the physiological value being within the second threshold value of the threshold physiological value, providing fourth video data to the output device, wherein the fourth video data represents one or more of the first user or a third user performing a second activity.

10. The method of claim 4, wherein the first position is represented by a first plurality of points, and each point of the first plurality of points represents a location of a respective body part of the first user, and wherein the second position is represented by a second plurality of points, and each point of the second plurality of points represents a location of a respective body part of the second user.

11. The method of claim 4, further comprising:
determining a first output rate for the third video data;
determining, based on the second video data, third pose data representing a fourth position of the second user at a fourth time subsequent to the second time;
determining that the fourth position differs from the third position by at least a second threshold value; and
in response to the fourth position differing from the third position by at least the second threshold value, determining a second output rate that is less than the first output rate.

12. The method of claim 4, further comprising:
determining, based on the second video data, third pose data representing a fourth position of the second user at a fourth time subsequent to the second time;
determining that the fourth position differs from the third position by at least a second threshold value; and
in response to the fourth position differing from the third position by at least the second threshold value, causing the output device to repeat presentation of a portion of the third video data associated with the third position.

13. A system comprising:
one or more memories storing computer-executable instructions; and
one or more hardware processors to execute the computer-executable instructions to:
access first video data that represents a first user performing a first activity;
determine, based on the first video data, first pose data representing a first position of the first user at a first time;
determine a first rate of movement of the first user;
acquire, using a camera, second video data that represents a second user performing the first activity;
determine, based on the second video data, second pose data representing a second position of the second user at a second time;
determine a second rate of movement of the second user;
determine that the second position corresponds to the first position within a first threshold value;
determine, based on the first rate of movement and the second rate of movement, an output rate for presentation of output;
in response to the second position corresponding to the first position within the first threshold value, provide third video data to an output device associated with the second user, wherein the third video data represents a third position of the first user at a third time subsequent to the first time; and
provide data indicative of the output rate to the output device to cause the output device to present output based on the third video data at the output rate.

14. The system of claim 13, further comprising computer-executable instructions to:
determine a first interval of time between the first time and the third time, wherein the first rate of movement is determined based on the first interval;
determine, based on the second video data, a fourth position of the second user at a fourth time subsequent to the second time; and
determine a second interval of time between the second time and the fourth time, wherein the second rate of movement is determined based on the second interval, and the output rate is determined based on a relationship between the first interval and the second interval.

15. The system of claim 13, further comprising computer-executable instructions to:
determine, based on the first video data, third pose data indicative of a fourth position of the first user at a fourth time subsequent to the first time;
determine, based on the second video data, fourth pose data indicative of a fifth position of the second user at a fifth time subsequent to the second time; and
determine that the fourth position corresponds to the fifth position within the first threshold value, wherein the third video data is provided further in response to the fourth position corresponding to the fifth position.

16. The system of claim 13, further comprising computer-executable instructions to:
determine, based on the second video data, a third rate of movement of the second user at the third time;
determine that the third rate of movement is greater than a second threshold value; and
in response to the third rate of movement being greater than the second threshold value, provide fourth video data representing performance of a second activity to the output device.

17. The system of claim 13, further comprising computer-executable instructions to:
determine, based on the second video data, a third rate of movement of the second user at the third time;
determine that the third rate of movement is less than a second threshold value; and
in response to the third rate of movement being less than the second threshold value, one or more of: decrease the output rate, cause the output device to present the third video data at a fourth time subsequent to the third time, or cause the output device to present fourth video data associated with a fourth rate of movement that is less than the second threshold value.

18. The system of claim 13, further comprising computer-executable instructions to:
determine, based on the second video data, third pose data indicative of a fourth position of the second user at the third time;
determine that the fourth position differs from the third position by at least a second threshold value; and
in response to the fourth position differing from the third position, one or more of:
decrease the output rate, cause the output device to present the third video data at a fourth time subsequent to the third time, or cause the output device to present fourth video data associated with a second activity.

19. The system of claim 18, wherein the third position is represented by a first plurality of points, and each point of the first plurality of points represents a location of a respective body part of the first user, and the fourth position is represented by a second plurality of points, and each point of the second plurality of points represents a location of a respective body part of the second user, the system further comprising computer-executable instructions to:
determine at least one point of the second plurality of points that is associated with a difference between the fourth position and the third position;
determine the respective body part of the second user associated with the at least one point of the second plurality of points; and
provide data indicative of a notification that indicates the respective body part of the second user to the output device.

20. The system of claim 13, further comprising computer-executable instructions to:
determine, based on the second video data, third pose data indicative of a fourth position of the second user at the third time;
determine that the fourth position corresponds to the third position within a second threshold value; and
in response to the fourth position corresponding to the third position within the second threshold value, provide fourth video data representing performance of a second activity to the output device.

21. A system comprising:
one or more memories storing computer-executable instructions; and
one or more hardware processors to execute the computer-executable instructions to:
acquire, using a camera, first video data representing a first user performing an activity;
determine, based on the first video data, first pose data representing a first position of the first user at a first time;
determine, based on second video data, second pose data representing a second position of a second user at a second time;
determine, based on the first pose data and the second pose data, that the second position corresponds to the first position within a threshold value; and
based on the second position corresponding to the first position within the threshold value, determine third video data that represents the second user in a third position at a third time subsequent to the first time.

* * * * *